United States Patent
Nordstrom et al.

(10) Patent No.: US 7,200,687 B2
(45) Date of Patent: Apr. 3, 2007

(54) LOCATION-BASED NON-UNIFORM ALLOCATION OF MEMORY RESOURCES IN MEMORY MAPPED INPUT/OUTPUT FABRIC

(75) Inventors: Gregory Michael Nordstrom, Pine Island, MN (US); Travis James Pizel, Rochester, MN (US)

(73) Assignee: International Business Machines Coporation, Armonk, NY (US)

( * ) Notice: Subject to any disclaimer, the term of this patent is extended or adjusted under 35 U.S.C. 154(b) by 376 days.

(21) Appl. No.: 10/671,365

(22) Filed: Sep. 25, 2003

(65) Prior Publication Data

US 2005/0071521 A1   Mar. 31, 2005

(51) Int. Cl.
*G06F 3/00*   (2006.01)

(52) U.S. Cl. ............................. 710/9; 710/60; 710/316; 711/203

(58) Field of Classification Search ........ 710/305–317, 710/22–27, 36–38, 8–17; 711/202–204, 711/170–173
See application file for complete search history.

(56) References Cited

U.S. PATENT DOCUMENTS

| | | | | |
|---|---|---|---|---|
| 5,581,787 A * | 12/1996 | Saeki et al. | ..................... | 710/9 |
| 5,835,738 A * | 11/1998 | Blackledge et al. | ........ | 710/307 |
| 5,884,027 A * | 3/1999 | Garbus et al. | .............. | 709/250 |
| 5,999,743 A * | 12/1999 | Horan et al. | ................... | 710/56 |
| 6,094,699 A * | 7/2000 | Surugucchi et al. | ........ | 710/314 |
| 6,526,459 B1 * | 2/2003 | Campbell et al. | ............. | 710/51 |
| 6,594,712 B1 * | 7/2003 | Pettey et al. | ................... | 710/22 |
| 6,658,521 B1 * | 12/2003 | Biran et al. | ................. | 710/315 |
| 6,823,418 B2 * | 11/2004 | Langendorf et al. | ........ | 710/306 |
| 6,854,032 B2 * | 2/2005 | Dearth et al. | ................... | 711/2 |
| 6,907,510 B2 * | 6/2005 | Bennett et al. | ............. | 711/202 |
| 2002/0078271 A1 * | 6/2002 | Berry | .......................... | 710/36 |

* cited by examiner

*Primary Examiner*—Mark H. Rinehart
*Assistant Examiner*—Raymond N Phan
(74) *Attorney, Agent, or Firm*—Wood, Herron & Evans, LLP

(57) ABSTRACT

An apparatus, program product and method in which a memory address space is allocated non-uniformly to IO resources in a memory mapped IO fabric based upon the locations of individual IO endpoints to which such IO resources are coupled. In a PCI-based environment, for example, PCI adapters are allocated memory address ranges in a PCI bus address space based upon the locations of the particular slots within which the PCI adapters are mounted.

33 Claims, 3 Drawing Sheets

LOCATION-BASED NON-UNIFORM ALLOCATION OF MEMORY RESOURCES IN MEMORY MAPPED INPUT/OUTPUT FABRIC

FIELD OF THE INVENTION

The invention relates to computers and computer software, and in particular, to allocating memory to input/output resources in a memory mapped input/output fabric.

BACKGROUND OF THE INVENTION

Given the continually increased reliance on computers in contemporary society, computer technology has had to advance on many fronts to keep up with both increased performance demands, as well as the increasingly more significant positions of trust being placed with computers. In particular, computers are increasingly used in high performance and mission critical applications where considerable processing must be performed on a constant basis, and where any periods of downtime are simply unacceptable.

Increases in performance often require the use of increasingly faster and more complex hardware components. Furthermore, in many applications, multiple hardware components, such as processors and peripheral components such as storage devices, network connections, etc., are operated in parallel to increase overall system performance.

One particular area to which development efforts have been directed is that of managing the peripheral hardware components utilized by a computer, e.g., storage devices, network connections, workstations, and the adapters, controllers and other interconnection hardware devices utilized to connect such components to the central processing units of the computer. Peripheral components, which are referred to hereinafter as input/output (IO) resources, are typically coupled to a computer via one or more intermediate interconnection hardware devices components that form a "fabric" through which communications between the central processing units and the IO resources are passed.

In lower performance computer designs, e.g., single user computers such as desktop computers, laptop computers, and the like, the IO fabric used in such designs may require only a relatively simple design, e.g., using an IO chipset that supports a few interconnection technologies such as Integrated Drive Electronics (IDE), Peripheral Component Interconnect (PCI) or Universal Serial Bus (USB). In higher performance computer designs, on the other hand, the IO requirements may be such that a complex configuration of interconnection hardware devices is required to handle all of necessary communications needs for such designs. In some instances, the communications needs may be great enough to require the use of one or more additional enclosures that are separate from, and coupled to, the enclosure within which the central processing units of a computer are housed.

Often, in more complex designs, peripheral components such as IO adapters are disposed on printed circuit boards, or cards, which are mounted and coupled to an IO fabric using "slots" that are arrayed in either or both of a main enclosure or an auxiliary enclosure of a computer. Other components may be mounted or coupled to an IO fabric in other manners, e.g., via cables and other types of connectors, however, often these other types of connections are referred to as "slots" for the sake of convenience. Irrespective of the type of connection used, an IO slot therefore represents a connection point, or IO endpoint, for an IO resource to communicate with a computer via an IO fabric. In some instances, the term "IO slot" is also used to refer to the actual peripheral hardware component mounted to a particular connection point in an IO fabric, and in this regard, an IO slot, or the IO resource coupled thereto, may also be referred to hereinafter as an endpoint IO resource.

Keeping in mind the goal of minimizing system downtime, many IO fabrics also support the ability to "hot plug" IO endpoint resources, such that IO endpoint resources may be disconnected from or connected to the IO fabric without having to shut down the system. Often, complex systems support the ability to dynamically reconfigure the IO fabric to accommodate the removal/addition of IO endpoint resources during runtime.

It is common in many computer systems, particularly those employing PCI-compatible IO buses and adapters, for computer programs such as device drivers to use memory-mapped input/output (MMIO) to communicate with IO endpoint resources. This allows computer programs such as device drivers executing on the computer systems to treat IO resources such as adapters as if they were logically connected directly to the processor/memory bus of the system and just an extension of the system memory occupying a particular memory address range. A device driver may then communicate with an adapter using processor load or store instructions targeting "memory" addresses that correlate directly to internal adapter facilities. In such a model the device drivers are largely unaware of the composition and arrangement of IO fabric elements, and rely on the IO fabric and IO adapters to behave as if the device drivers were simply accessing a memory region in response to a memory-mapped load or store.

The allocation of memory address ranges to IO resources such as IO adapters, however, can be problematic, particularly in complex computer systems supporting dynamic reconfiguration of IO resources during system runtime. In less complex computers such as single-user computers and the like, system firmware typically chooses a memory range for each IO slot during startup, and assigns a memory range to a particular slot only when an IO adapter is actually detected in that slot and the actual memory requirement of that particular adapter model can be determined.

An assignment of memory only to detected IO adapters at startup, however, has been found to have significant drawbacks in computers in which reconfiguring an IO fabric on an active system may be necessary. If, for example, an IO adapter is initially configured in a slot that requires 16 MB of memory, and the firmware assigns exactly that much, if the adapter is later replaced by a different IO adapter that requires more memory, the firmware must either find an unused range of memory space that can accommodate the size required by the new IO adapter or reboot the computer in order to reassign memory space to all configured IO adapters.

High performance multi-user computers, on the other hand, often require the ability to concurrently replace or add IO adapters with minimal or no impact on system availability. It is often not practical such computers to reboot the whole platform in order to "re-size" memory as a result of a change in IO adapter configuration. Therefore, the platform firmware typically must choose memory assignments throughout the IO fabric prior to knowing the memory requirements of each installed IO adapter. This becomes more compelling with IO fabrics that offer a multiplicity of IO endpoints or slots that are hot pluggable such that IO adapters may be added as the customer requires them.

Hot pluggable and on demand implies that an IO adapter can be added non-disruptively. To accomplish this, as the specific memory requirements of an IO adapter cannot be known if the IO slot is empty during platform boot, or the IO adapter is de-configured, firmware must apply some method of determining an "appropriate" amount of PCI memory for each IO slot prior to knowing the actual requirements of each possible IO adapter.

In addition, in some computer designs, the amount of memory address space available to allocate to IO resources is limited in nature. As such, it is often not an acceptable solution to simply allocate more of the memory address space to each IO slot from the outset, and irrespective of the particular IO adapter that is or will be installed in that slot.

Some designs have attempted to allocate memory address space on the basis of connector type. For example, in some PCI-based environments, IO slots and adapters may support either 32-bit or 64-bit connectors. In such designs, IO slots may be assigned different amounts of memory address space to each IO slot based simply upon connector type (e.g., 128 MB for a 32-bit connector, and 256 MB for a 64-bit connector). These choices are based on a loose principal that 32-bit adapters have less function and complexity than 64-bit adapters, and that these values (128 MB and 256 MB) represent a "good guess" at how much of the memory address space "most" IO adapters require.

However, it has become apparent from such "good guess" choices of a priori assignments that some adapters, even though they may be only a few select models, may not work at all on a particular platform as a result of these fixed allocations of the memory address space. As adapters have grown in complexity, it is not unreasonable to expect that some adapters will exceed these "good guess" values. On the other hand, while selecting higher allocations for different connector types may enable a platform to accommodate additional types of IO adapters, such higher allocations will increase inefficiency for those adapters that do not require as much memory address space, and may limit the number of adapters that may coexist in a fixed memory space.

Additionally, some systems support the use of bridge adapters that can expand an IO fabric into external enclosures to accommodate additional IO endpoints and adapters. Bridge adapters themselves, however, are typically incapable of reporting the memory requirements of the IO adapters being managed thereby. Therefore, it is possible that, while no individual IO adapter that might be plugged into an IO slot requires more than the "good guess" choice for that slot, the placement of such an "expansion" bridge adapter in that slot could result in that slot requiring a memory address space aggregating over multiple IO adapters below that bridge adapter so as to greatly exceed the "good guess" choice.

Therefore, a significant need has arisen in the art for a more efficient and flexible manner of allocating memory address space to IO resources in a memory mapped IO fabric.

SUMMARY OF THE INVENTION

The invention addresses these and other problems associated with the prior art by providing an apparatus, program product and method in which a memory address space is allocated non-uniformly to IO resources in a memory mapped IO fabric based upon the locations of individual IO endpoints to which such IO resources are coupled. Put another way, the amount of a memory address space allocated to an IO resource is based upon which IO endpoint in an IO fabric the IO resource is connected.

In many embodiments consistent with the invention, the amount of memory address space that will be allocated to each IO endpoint in a particular IO fabric element such as an IO enclosure or bridge can be made available to customers and systems administration personnel, e.g., via a publication, so that IO resources can ultimately be installed in appropriate IO endpoints based upon the memory requirements of those IO resources. By doing so, the particular memory requirements of different IO resources may be better matched with the actual memory space allocated so such resources, resulting in a more efficient allocation of memory resources system wide.

Therefore, consistent with the invention, memory address space may be allocated to a plurality of IO resources coupled to a plurality of IO endpoints in a memory mapped IO fabric by determining a location in the memory mapped IO fabric for each IO endpoint among the plurality of endpoints, and non-uniformly allocating memory address ranges to the plurality of IO endpoints based upon the determined locations of the IO endpoints in the memory mapped IO fabric.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter utilize location-based memory allocation to allocate memory ranges from a memory mapped IO fabric memory address space to various IO resources coupled to such a fabric, e.g., peripheral hardware components such as network connections, storage devices, printers, workstations, and/or the adapters and/or controllers therefor.

As will become more apparent below, embodiments consistent with the invention may utilize memory mapped IO fabrics including PCI-compatible IO fabrics, among others. Moreover, embodiments consistent with the invention may incorporate an innumerable number and types of IO fabric elements in a memory mapped IO fabric, including, for example, bridge devices, hub devices, switches, connectors, host devices, slave devices, controller devices, cables, modems, serializers/deserializers, optoelectronic transceivers, etc. It will be appreciated that various of such elements may support connectivity to IO resources through the provision of one or more IO endpoints, e.g., IO slots to which IO adapters may be coupled. It will be equally appreciated, however, that the invention is limited neither to PCI-based IO fabrics, nor slot-based architectures.

Figure 1:
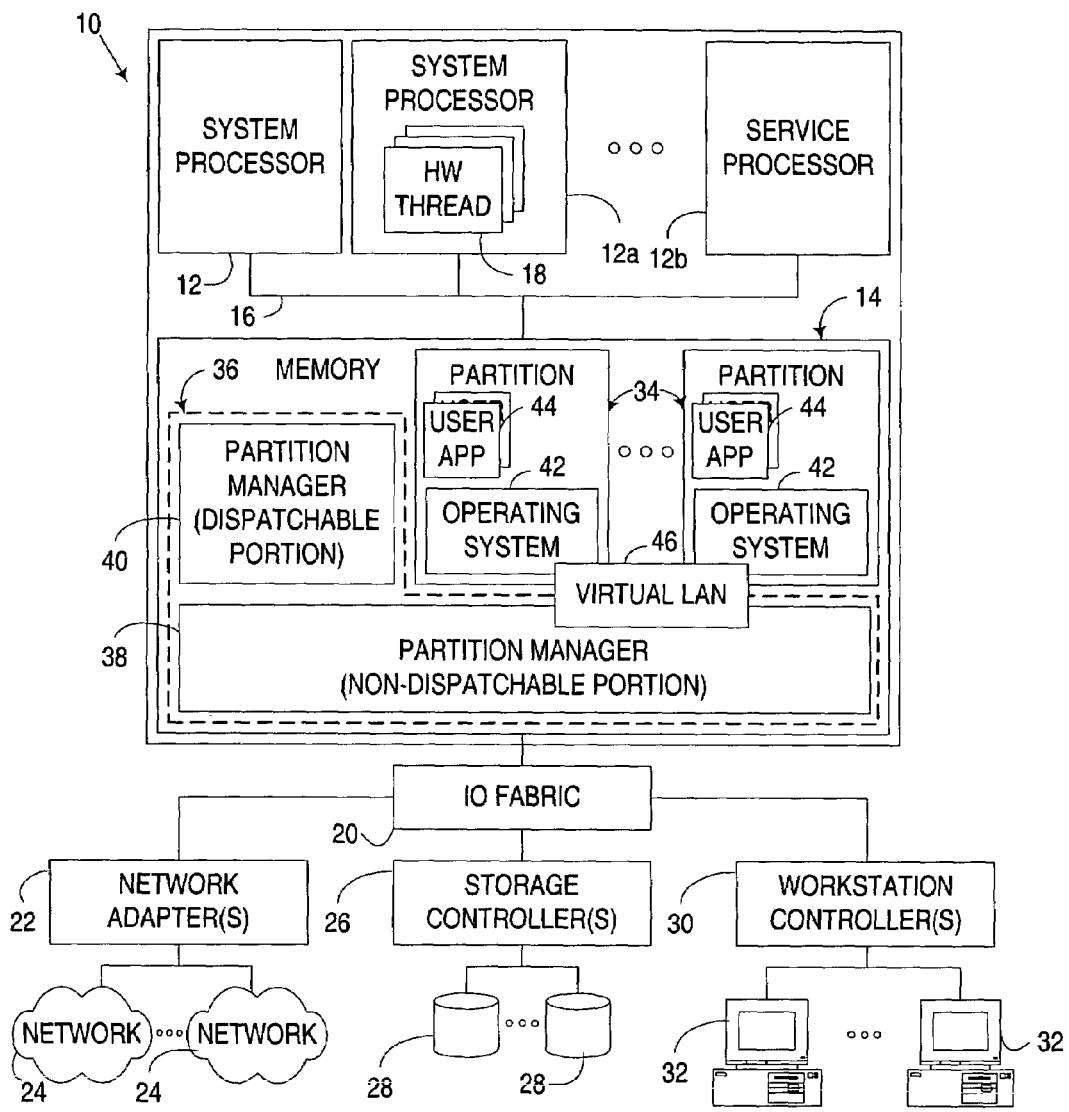
FIG. 1 is a block diagram of the principal hardware components in a logically-partitioned computer incorporating location-based memory allocation consistent with the invention.

Turning now to the Drawings, wherein like numbers denote like parts throughout the several views, FIG. 1 illustrates the principal hardware components in a computer I0 capable of implementing location-based memory allocation consistent with the invention. Computer I0 is illustrated as a logically-partitioned computer, and may generically represent, for example, any of a number of multi-user computers such as a network server, a midrange computer, a mainframe computer, etc., e.g., an IBM eServer iSeries or pSeries computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like), as well as other multi-user computers including non-logically-partitioned computers.

Computer I0 generally includes one or more processors 12 coupled to a memory 14 via a bus 16. Each processor 12 may be implemented as a single threaded processor, or as a multithreaded processor, such as with processor 12a, which is shown incorporating a plurality of hardware threads 18. For the most part, each hardware thread 18 in a multi-threaded processor 12a is treated like an independent processor by the software resident in the computer.

In addition, as is also illustrated in FIG. 1, one or more of processors 12 (e.g., processor 12b) may be implemented as a service processor, which is used to run specialized firmware code to manage system initial program loads (IPL's), and to monitor, diagnose and configure system hardware. Generally, computer 10 will include one service processor and multiple system processors, which are used to execute the operating systems and applications resident in the computer, although the invention is not limited to this particular implementation. In some implementations, a service processor may be coupled to the various other hardware components in the computer in manners other than through bus 16.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via an IO fabric 20, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

FIG. 1 also illustrates in greater detail the primary software components and resources utilized in implementing a logically partitioned computing environment on computer 10, including a plurality of logical partitions 34 managed by a partition manager or hypervisor 36. Any number of logical partitions may be supported as is well known in the art, and the number of logical partitions resident at any time in a computer may change dynamically as partitions are added or removed from the computer.

In the illustrated IBM eServer-based implementation, partition manager 36 is comprised of two layers of program code. The first, referred to herein as a non-dispatchable portion 38, is implemented within the firmware, or licensed internal code (LIC), of computer 10, which is utilized to provide a low level interface to various hardware components while isolating higher layers, e.g., the operating systems, from the details of the hardware access. The firmware may also communicate with a service processor such as service processor 12b. The non-dispatchable portion 38 provides many of the low level partition management functions for computer 10, e.g., page table management, etc. The non-dispatchable portion 38 also has no concept of tasks, and is accessible principally via function calls from higher layers of software, or interrupts from the hardware.

The second layer of program code in partition manager 36 is referred to herein as a dispatchable portion 40. In contrast to non-dispatchable portion 38, which has no concept of tasks, is run with memory relocation off, and is accessible via supervisor function calls from higher layers of software, the dispatchable portion 40 has the concept of tasks (like any operating system), and is run with memory relocation on. The dispatchable portion typically executes in much the same manner as a partition, except that it is hidden from the user. The dispatchable portion generally manages higher level partition management operations such as creating and deleting partitions, concurrent hardware maintenance, allocating processors, memory and other hardware resources to various partitions 34, etc.

Each logical partition 34 is typically statically and/or dynamically allocated a portion of the available resources in computer 10. For example, each logical partition may be allocated one or more processors 12 and/or one or more hardware threads 18, as well as a portion of the available memory space. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, display devices, and the IO adapters therefor, are typically allocated to one or more logical partitions in a manner well known in the art. In other embodiments, e.g., non-logically-partitioned computers, all IO resources are typically available on a system-wide basis.

Each logical partition 34 utilizes an operating system 42 that controls the primary operations of the logical partition in the same manner as the operating system of a non-partitioned computer. For example, each operating system 42 may be implemented using the OS/400 operating system available from International Business Machines Corporation, as well as other operating systems such as AIX, UNIX, Linux, etc.

Each logical partition 34 executes in a separate, or independent, memory space, and thus each logical partition acts much the same as an independent, non-partitioned computer from the perspective of each user application (user app) 44 that executes in each such logical partition. As such, user applications typically do not require any special configuration for use in a partitioned environment.

Given the nature of logical partitions 34 as separate virtual computers, it may be desirable to support inter-partition communication to permit the logical partitions to communicate with one another as if the logical partitions were on separate physical machines. As such, in some implementations it may be desirable to support a virtual local area network (LAN) 46 in non-dispatchable portion 38 to permit logical partitions 34 to communicate with one another via a networking protocol such as the Ethernet protocol. Other manners of supporting communication between partitions may also be supported consistent with the invention.

It will be appreciated that other logically-partitioned environments may be utilized consistent with the invention. For example, the dispatchable portion of a partition manager may be resident in a specific logical partition (typically designated as a primary logical partition).

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
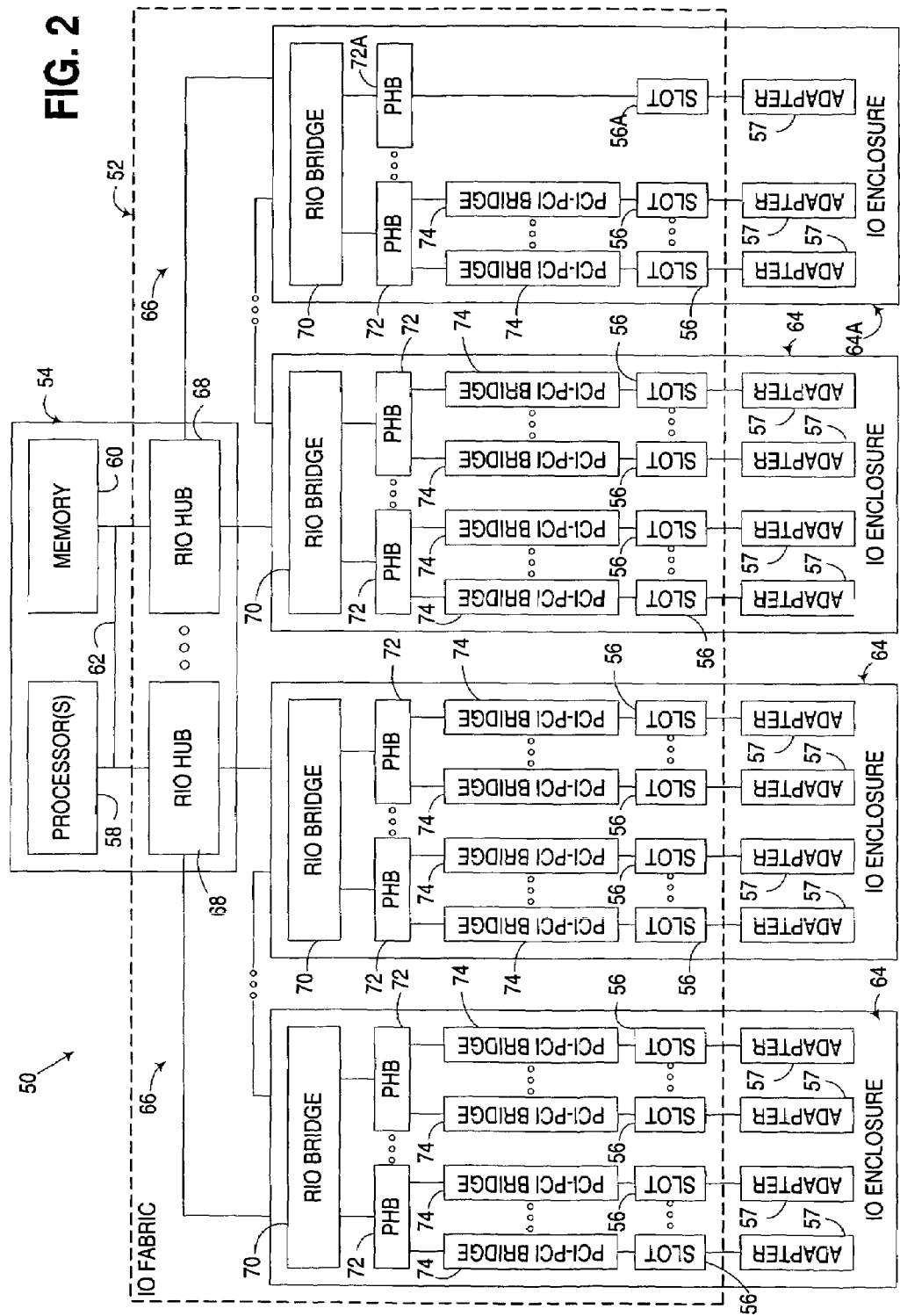
FIG. 2 is a block diagram of an exemplary memory mapped IO fabric capable of being utilized in connection with location-based memory allocation consistent with the invention.

Now turning to FIG. 2, an exemplary computer system 50 with an IO fabric 52, used to couple the Central Electronics Complex (CEC) 54 of the system to a plurality of IO resources 57 (e.g., IO adapters) via a plurality of IO endpoints 56 (e.g., IO slots), is illustrated. CEC 54 is illustrated as including one or more processors 58 and memory 60 coupled to a processor/memory or system bus 62, and may correspond, for example, to that portion of computer 10 above IO fabric 20 in FIG. 1. In the illustrated embodiment, CEC 54 is housed in a separate enclosure from the IO slots 56, and as such, the IO slots are housed in groups in one or more IO enclosures 64. It will be appreciated that in some implementations the components illustrated in FIG. 2 may be incorporated into the same enclosure.

IO fabric 52 comprises one or more remote IO (RIO) networks 66, with each network 66 laid out in a loop topology, including a RIO hub 68 housed in the CEC 54 and coupled to processor/memory bus 62, along with one or more RIO bridges 70 disposed in IO enclosures 64. Each RIO bridge 70 is in turn coupled to one or more PCI host bridges (PHB's) 72 to support a PCI-compatible interface, e.g., PCI, PCI-X or PCI Express. Each PHB 72 hosts a primary PCI bus, which is coupled to plurality of PCI-PCI bridges 74, each of which in turn connects an associated IO slot 56 to a secondary PCI bus. In the alternative, the primary PCI bus of one or more PHB's 72 may directly couple to an IO slot (e.g., as illustrated in FIG. 2 by PHB 72A in IO enclosure 64A, which is directly coupled to an IO slot 56A).

IO slots 56 may be implemented, for example, as connectors that receive a PCI-compatible adapter card, or PCI adapter chips embedded (soldered) directly on the electronic planar that incorporates the PCI-PCI bridge and/or PHB.

As noted above, a PCI-based interface supports memory mapped input/output (MMIO). As such, when computer 50 initializes IO fabric 52, the computer may be permitted to "bind" processor addresses to specific PCI adapter memory, for MMIO from a processor 58 to the adapters, and addresses from memory 60 to the adapters, to enable adapters to DMA to or from memory 60.

In the illustrated embodiment, utilizing PCI-PCI bridges 74 intermediate PHB's 72 and IO slots 56 enables additional signaling and adapter binding isolation between individual adapters and the PHB's 72, RIO elements 68, 70, processors 58, and memory 60. The additional isolation may be used, for example, to permit assignment of individual IO slots to different logical partitions resident in the computer (if logical partitioning is implemented therein).

Also in the illustrated embodiment, a hot plug controller is desirably associated with each IO slot, and incorporated into either PHB's 72 or PCI-PCI bridges 74, to allow electrical power to be selectively applied to each IO slot 56 independent of the state of power to other IO slots 56 in the system. In addition, in some embodiments, groups of IO fabric elements may be integrated into a common integrated circuit or card. For example, multiple PCI-PCI bridges 74 may be disposed on a common integrated circuit.

It will be appreciated that an innumerable number of alternate configurations that support the communication between an endpoint IO resource and a processor in a computer may be utilized for an IO fabric consistent with the invention. For example, a number of different memory mapped IO-based interconnect standards, including but not limited to USB, IDE, EISA, PCI-Express, MicroChannel, and Infiniband, may be used in lieu of, or in addition to, PCI. Moreover, alternate numbers and configurations of bridges, switches, hosts, hubs, enclosures, adapters, connectors, communication protocols, controllers, and other types of hardware devices may be incorporated into a memory mapped IO fabric consistent with the invention. It will therefore be appreciated that the configuration of FIG. 2 is merely exemplary in nature, and the invention is not limited to the particular configuration disclosed herein.

In the illustrated embodiment, in which a PCI-based IO fabric is used to couple IO adapters to a logically-partitioned computer such as an iSeries or pSeries computer, location-based memory allocation results in a non-uniform assignment of address ranges in the PCI memory space to PCI bus slots, which may be used, for example, to provide selected slots on each physical PCI bus enclosure with large PCI memory regions. In addition, such memory allocation may also be used to provide architecturally-required minimums for the operating system(s) installed in the computer (e.g., for the AIX operating system, 128 MB per 32-bit slot and 256 MB per 64-bit slot).

In this embodiment, assignments are chosen by the computer configuration firmware (e.g., resident in the partition manager of a logically-partitioned computer) when an IO enclosure is detected and its particular type or IO slot configuration is determined. The result is that each enclosure type or PCI bus backplane can offer selected slots that can be specified in customer configuration directives or software so as to accommodate the dynamic PCI memory requirements of particular adapter models or PCI expansion configurations.

As such, the embodiment discussed in greater detail hereinafter operates by assigning different ranges of PCI memory addresses to IO slots based on what PCI backplane the slot resides on, as well as the slot number on a given PCI backplane. It is anticipated that the size of a PCI memory address range assigned to each slot on a given backplane would be published, allowing customers to plug adapters that require greater PCI memory ranges (e.g., adapters that configure multiple devices) into slots that are assigned appropriate amounts of PCI memory addresses, or allowing automated customer-order placement configuration programs to choose a slot (e.g., based upon a known or stored customer configuration).

As will become more apparent below, in the illustrated embodiment, as the configuration firmware discovers and configures each PCI Host Bridge (PHB), a PCI memory address range is assigned to that PHB. That range is subsequently divided among the PCI Secondary Buses (IO slots) below the PHB. By querying configuration data referred to as Vital Product Data (VPD), the firmware is able to determine the PCI backplane on which the PHB resides, as well as the slot configuration below it. Based upon this location information, the firmware allocates a predetermined amount of PCI memory space for memory mapped IO operations predefined for each slot based on the slot configuration of that backplane. Of note, it may be desirable to default to a configuration whereby a 32-bit slot is allocated 128 MB of PCI memory, while a 64-bit slot is allocated 256 MB of PCI memory, whenever no specific allocation is predetermined for a slot by the configuration data.

Figure 3:
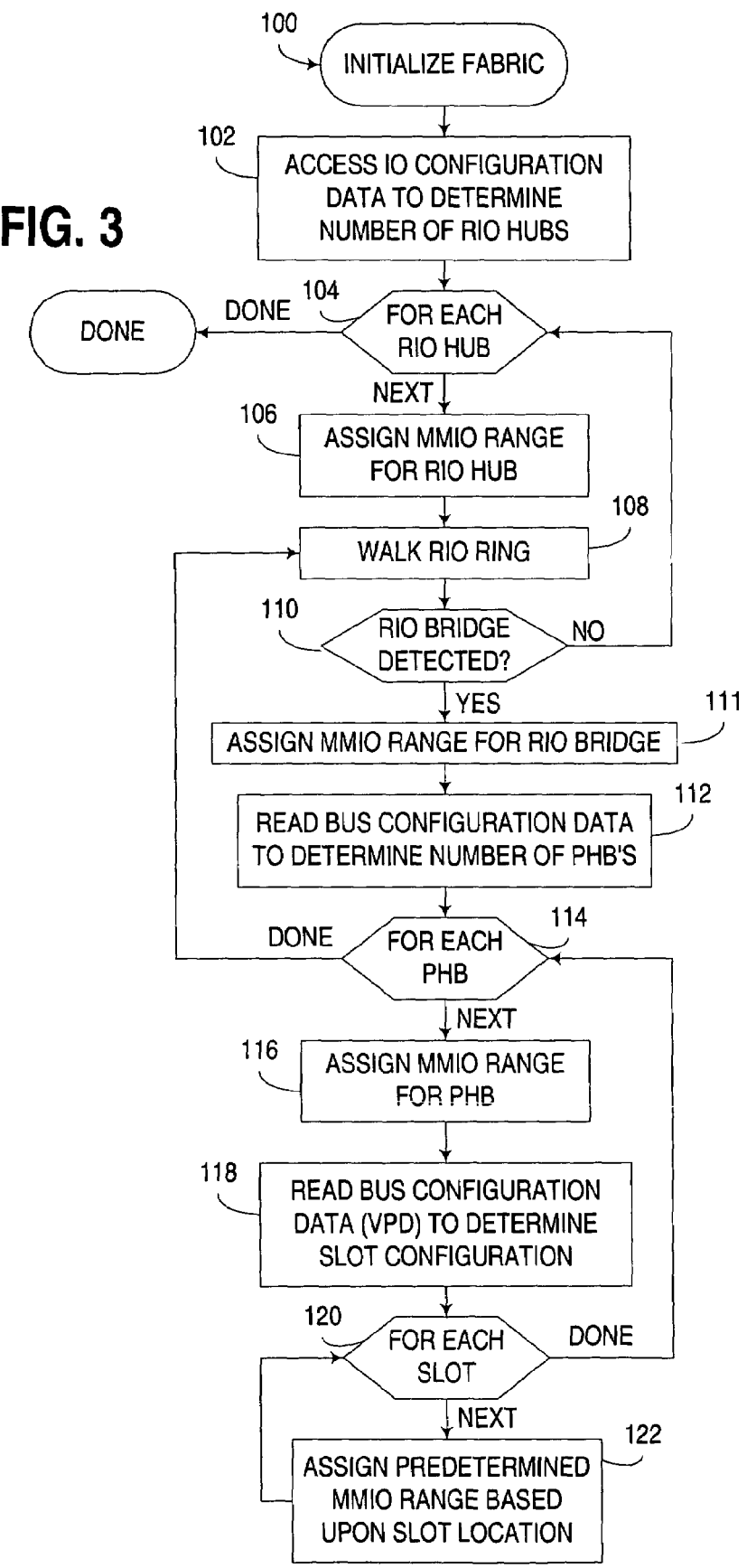
FIG. 3 is a flowchart illustrating the initialization of the memory mapped IO fabric of FIG. 2.

Now turning to FIG. 3, an exemplary initialize fabric routine 100 is illustrated. Routine 100 may be called, for example, when it is desirable to initialize the IO fabric, e.g., during initialization of the system. It will also be appreciated that the functionality of routine 100 may also be implemented during different stages of the execution of a computer, e.g., to dynamically allocate a memory address range for an IO enclosure or other IO fabric element that has been added to the IO fabric during run time.

Routine 100 begins in block 102 by accessing IO configuration data to determine the number of RIO hubs, and thus RIO rings, in the IO fabric. Block 104 then initiates a FOR loop to process each RIO hub/ring.

For each such hub/ring block 106 assigns a memory-mapped IO range to the RIO hub. It will be appreciated that address translation may be utilized by a RIO hub, thus enabling IO endpoints in different rings to use duplicate address ranges.

Next, block 108 walks the RIO ring, and block 110 attempts to determine whether a RIO bridge (typically, the bus adapter therefor) is detected on the ring. If no such RIO bridge is detected, control returns to block 104 to process additional RIO hubs/rings. Otherwise, if a RIO bridge is detected, control is passed to block 111 to assign a memory-mapped IO range to the RIO bridge from within the range assigned to the RIO hub/ring. Control then passes to block 112 to read bus configuration data (representing the configuration data for the backplane/enclosure) to determine the number of PHB's in the associated backplane/enclosure.

Next, a FOR loop is initiated in block 114 to process each PHB in the backplane/enclosure. For each such PHB, control passes to block 116 to assign a memory-mapped IO range to the PHB from within the range assigned to the RIO bridge.

Typically, the assignment of memory addresses to the PHB's is based on the number of PHB's resident in an enclosure/backplane. For example, assuming a 4 GB memory range allocated to a RIO bridge, it may be desirable to allocate 2 GB to each PHB when two PHB's are resident, and to allocate a memory address range into 1 GB, 1 GB and 2 GB partitions when three PHB's are resident. Typically, this allocation among PHB's is based upon the backplane identifier for the backplane to which the PHB's are coupled. It will also be appreciated that certain memory addresses from the address space for a RIO bridge may also be allocated to the bus adapter for memory mapping it's registers and other housekeeping purposes.

Next, once a memory-mapped IO range has been assigned to a PHB, control passes to block 118 to read the bus configuration data to determine the slot configuration under the PHB. Next, block 120 initiates a FOR loop to process each slot coupled to the PHB. For each such slot, a memory-mapped IO range is assigned to the slot based upon the slot location on the bus coupled to the PHB (block 122). After a memory address range is assigned to a slot in block 122, control returns to block 120 to process additional slots. Once each slot has been processed, block 120 then returns control to block 114 to process additional PHB's in the enclosure/backplane. Once each such PHB has then been processed, block 114 returns control to block 108 to continue to walk the RIO ring in search of additional RIO bridges. Once all such bridges have been found, block 110 then returns control to block 104 to process additional RIO hubs. Once all such RIO hubs have been processed, routine 100 is then complete.

It will be appreciated that the manner in which a location for a slot may be determined may be based at least in part on a slot number on a bus, or based upon some other form of slot identifier (e.g., alphanumeric). Moreover, the configuration data used to store slot and other identifiers may be resident in various elements of a computer. For example, configuration data may be associated with an IO enclosure, and thus stored in a RIO bridge. Configuration data may also be stored in a particular PHB. Furthermore, configuration data may be global to the IO fabric, and stored in the CEC. Configuration data may also be stored in a file system, on a specialized device, or in non-volatile solid state memory, among others. Given the innumerable number of manners in which configuration data may be stored and accessed on a computer, it will be appreciated that the invention is not limited to the particular implementation discussed herein.

Moreover, it will be appreciated that in addition to a slot identifier, the location of a slot or other IO endpoint may be based on additional location information, e.g., a bus identifier, an enclosure identifier, a PHB identifier, a bridge identifier, etc.

In addition, the configuration data provided for a backplane or enclosure may be used to identify the size of memory address range to allocate to each IO slot in different manners consistent with the invention. For example, the configuration data may simply identify a model number of a particular enclosure or backplane, with the model number used to access a database located internally in or externally to the computer to obtain the appropriate memory address allocation ranges to allocated to that model of enclosure or backplane. In the alternative, the configuration data itself may specify the desired memory address allocation ranges for that particular enclosure.

The manner in which memory address ranges are allocated to particular slots on a bus may vary in different implementations. For example, in the illustrated implementation, each slot on the secondary bus may be assigned an index starting at "1," with index "0" representing PCI bus memory reserved for PCI to PCI bridge MMIO registers. The firmware constructs for a PHB may initialize a slot memory table with memory and IO space assignments, which may be used to track the real and PCI base addresses and total size of each slot PCI memory and IO space allocation. For each unique backplane (e.g., for the backplane of an enclosure), configuration data may be associated with the backplane and accessed to identify the number of PHB's, the number of secondary buses, and the number of slots on each secondary bus. It may be desirable, for example, to allocate a nominal memory address range, e.g., 1 MB, to slot 0 for PHB's that do not attach a service processor, and to allocate a larger segment of memory addresses, e.g., 256 MB, to slot 0 for PHB's that do attach a service processor. The remainder of the memory address space allocated to each PHB may then be assigned based upon slot location. These allocations may be predetermined for a particular backplane model or determined by a programming heuristic at runtime.

Where no configuration data exists to assign particular allocations to particular slots, it may be desirable to default to an allocation mapping based upon data bus width/connector type (e.g., 32-bit versus 64-bit). Also, to minimize model dependencies, i.e., the number of backplane modules uniquely recognized and allocated differently, it may be desirable to provide a default mapping for PHB's. Table I, for example, illustrates an exemplary default PHB allocation that may be used to allocate a memory address range for a PHB connected to a secondary bus having four unique slots.

TABLE I

EXEMPLARY DEFAULT PHB ALLOCATION

| SLOT | PCI MEMORY SIZE | ALLOCATION BASE PCI ADDRESS |
|------|-----------------|------------------------------|
| 0 | 1 MB | 4 GB–1 MB |
| 1 | 255 MB | 4 GB–256 MB |
| 2 | 256 MB | 4 GB–512 MB |
| 3 | 512 MB | 3 GB |
| 4 | 1 GB | 2 GB |

It will also be appreciated that where the installed PHB configuration splits a paired 64-bit slot into two 32-bit slots, the default mapping may divide the associated PCI memory address allocation into two equal regions.

As noted above, for specific backplanes or enclosures, it is typically desirable to predefine a mapping of allocation ranges to slots based upon slot locations. For example, Table II illustrates an exemplary published allocation table that may be used for a particular backplane incorporating two PHB's, with one of which having four unique slots and the other having ten unique slots.

TABLE II

EXEMPLARY PUBLISHED ALLOCATION TABLE

| SLOT | PHB | PCI MEMORY SIZE | ALLOCATION BASE PCI ADDRESS |
|------|-----|------------------|------------------------------|
| 0 | 1 | 1 MB | 4 GB–1 MB |
| 1 | 1 | 255 MB | 4 GB–256 MB |
| 2 | 1 | 256 MB | 4 GB–512 MB |
| 3 | 1 | 512 MB | 3 GB |
| 4 | 1 | 1 GB | 2 GB |
| 0 | 2 | 1 MB | 4 GB–1 MB |
| 5 | 2 | 255 MB | 4 GB–256 MB |
| 6 | 2 | 128 MB | 4 GB–384 MB |
| 7 | 2 | 128 MB | 4 GB–512 MB |
| 9 | 2 | 256 MB | 4 GB–768 MB |
| 10 | 2 | 256 MB | 3 GB |
| 11 | 2 | 256 MB | 3 GB–256 MB |
| 12 | 2 | 128 MB | 3 GB–384 MB |
| 13 | 2 | 128 MB | 3 GB–512 MB |
| 14 | 2 | 256 MB | 3 GB–768 MB |
| 15 | 2 | 256 MB | 2 GB |

It should be noted that each PHB is shown having a 2 GB memory address range, resulting in a total of 4 GB of memory address range for the enclosure/backplane to which each PHB is coupled. Furthermore, it will be appreciated that slot 0 of each secondary bus is allocated 1 MB, with the remaining slots allocated varying ranges based upon slot location. Also of note, the base addresses are permitted to be duplicative, as address translation may be performed by each PHB.

Moreover, it will be appreciated that it may be desirable in many implementations to allocate the last slot among those managed by a particular PHB, the remainder of memory addresses allocated to the PHB and unused by the previous slots. For example, for PHB 1 of Table II, the remaining 1 GB of the 2 GB memory address space is allocated to slot 4 based upon the earlier allocation of slots 0–3.

In use, the customer wishing to install an IO resource in a particular IO slot or IO endpoint may reference the published table provided by the manufacturer to determine the memory address allocation range allocated to the available slots in the IO fabric. As such, should an IO adapter have only modest memory address range requirements, that IO adapter may be installed in a slot having modest allocation size. For an IO adapter having a greater memory requirement, a customer may seek an available slot having a suitable memory address allocation.

As a result, IO adapters and other IO resources may be installed in slots or other endpoints in a manner that efficiently utilizes the memory resources in a memory address space. Moreover, this implementation enables IO adapters having the same data bus width and connector type (e.g., 32-bit/64-bit) to be allocated different memory address range sizes.

It will be appreciated that the specific memory allocations discussed herein may vary in different implementations. Other modifications will be apparent to one of ordinary skill in the art. Therefore, the invention lies in the claims hereinafter appended.

What is claimed is:

1. A method of allocating a memory address space to a plurality of Peripheral Component Interconnect (PCI) adapters coupled to a plurality of slots in a PCI bus, the method comprising:

accessing configuration data associated with a slot identifier for each of the plurality of slots to determine a memory range size associated with each slot; and non-uniformly allocating memory address ranges to the plurality of PCI adapters based upon the memory range sizes associated with each slot, such that first and second PCI adapters among the plurality of PCI adapters that have the same connector type are allocated differently sized memory ranges.

2. A method of allocating memory addresses to a plurality of input/output (IO) resources coupled to a plurality of IO endpoints in a memory mapped IO fabric, the method comprising:

determining a location in the memory mapped IO fabric for each IO endpoint among the plurality of endpoints; and non-uniformly allocating memory address ranges to the plurality of IO endpoints based upon the determined locations of the IO endpoints in the memory mapped IO fabric, wherein allocating memory address ranges to the plurality of IO endpoints includes allocating differently sized memory address ranges to first and second IO endpoints having the same connector type.

3. The method of claim 2, wherein determining the location and non-uniformly allocating memory address ranges are performed during initialization of the memory mapped IO fabric.

4. The method of claim 2, wherein the first and second IO endpoints each comprise an IO slot, and wherein the connector types of the first and second IO endpoints have the same data bus width.

5. The method of claim 2, wherein the memory mapped IO fabric comprises a PCI-compatible fabric.

6. The method of claim 2, wherein the IO fabric includes at least one IO fabric element allowing connectivity to a subset of the plurality of IO endpoints, and wherein the memory address ranges that would be allocated to IO resources coupled to each IO endpoint in the plurality of IO endpoints are determinable from a publication available prior to installation of IO resources in the subset of IO endpoints.

7. The method of claim 3, wherein determining the location and non-uniformly allocating memory address ranges are performed during initialization of a computer to which the memory mapped IO fabric is coupled.

8. The method of claim 5, wherein the memory mapped IO fabric comprises at least one PCI-compatible bus, wherein at least a subset of IO endpoints are IO slots coupled to the PCI-compatible bus, and wherein the location of each IO slot is defined by a slot identifier for such IO slot on the PCI-compatible bus.

9. The method of claim 5, wherein the memory mapped IO fabric comprises a plurality of PCI-compatible buses, wherein at least a subset of IO endpoints are IO slots coupled to the plurality of PCI-compatible buses, and wherein the location of each IO slot is defined by a bus identifier for the PCI-compatible bus to which such IO slot is coupled, and a slot identifier for such IO slot on the PCI-compatible bus to which such IO slot is coupled.

10. The method of claim 7, wherein the computer comprises a logically-partitioned computer, and wherein determining the location and non-uniformly allocating memory address ranges are performed by a partition manager in the logically-partitioned computer.

11. The method of claim 9, wherein the memory mapped IO fabric comprises a plurality of IO enclosures, each IO enclosure including at least one PCI-compatible bus among the plurality of PCI-compatible buses, wherein determining the location of an IO endpoint comprises accessing configuration data associated with the IO enclosure within which such IO endpoint is disposed.

12. The method of claim 11, wherein non-uniformly allocating memory address ranges to the plurality of IO slots includes allocating a remaining memory address range to a last IO slot among the plurality of IO slots, wherein the remaining memory address range comprises that portion of the memory address range allocated to the PCI-compatible host that was not allocated to each other IO slot among the plurality of IO slots.

13. The method of claim 12, wherein non-uniformly allocating memory address ranges to the plurality of IO slots includes allocating a remaining memory address range to a last IO slot among the plurality of IO slots, wherein the remaining memory address range comprises that portion of the memory address range allocated to the PCI-compatible host that was not allocated to each other IO slot among the plurality of IO slots.

14. An apparatus, comprising:

at least one processor;

program code configured to be executed by the at least one processor to allocate memory address space to a plurality of input/output (IO) resources coupled to a plurality of IO endpoints in a memory mapped IO fabric by determining a location in the memory mapped IO fabric for each IO endpoint among the plurality of endpoints, and non-uniformly allocating memory address ranges to the plurality of IO endpoints based upon the determined locations of the IO endpoints in the memory mapped IO fabric, wherein the program code is configured to allocate memory address ranges to the plurality of IO endpoints by allocating differently sized memory address ranges to first and second IO endpoints having the same connector type.

15. The apparatus of claim 14, wherein the program code is configured to determine the location and non-uniformly allocate memory address ranges during initialization of the memory mapped IO fabric.

16. The apparatus of claim 14, wherein the first and second IO endpoints each comprise an IO slot, and wherein the connector types of the first and second IO endpoints have the same data bus width.

17. The apparatus of claim 14, wherein the memory mapped IO fabric comprises a PCI-compatible fabric.

18. The apparatus of claim 14, wherein the IO fabric includes at least one IO fabric element allowing connectivity to a subset of the plurality of IO endpoints, and wherein the memory address ranges that would be allocated to IO resources coupled to each IO endpoint in the plurality of IO endpoints are determinable from a publication available prior to installation of IO resources in the subset of IO endpoints.

19. The apparatus of claim 14, further comprising the plurality of IO resources and the memory mapped IO fabric.

20. The apparatus of claim 15, wherein the program code is configured to determine the location and non-uniformly allocate memory address ranges during initialization of the apparatus.

21. The apparatus of claim 17, wherein the memory mapped IO fabric comprises at least one PCI-compatible bus, wherein at least a subset of IO endpoints are IO slots coupled to the PCI-compatible bus, and wherein the location of each IO slot is defined by a slot identifier for such IO slot on the PCI-compatible bus.

22. The apparatus of claim 17, wherein the memory mapped IO fabric comprises a plurality of PCI-compatible buses, wherein at least a subset of IO endpoints are IO slots coupled to the plurality of PCI-compatible buses, and wherein the location of each IO slot is defined by a bus identifier for the PCI-compatible bus to which such IO slot is coupled, and a slot identifier for such IO slot on the PCI-compatible bus to which such IO slot is coupled.

23. The apparatus of claim 20, wherein the apparatus comprises a logically-partitioned computer, and wherein the program code is resident in a partition manager in the logically-partitioned computer.

24. The apparatus of claim 22, wherein the memory mapped IO fabric comprises a plurality of IO enclosures, each IO enclosure including at least one PCI-compatible bus among the plurality of PCI-compatible buses, wherein the program code is configured to determine the location of an IO endpoint by accessing configuration data associated with the IO enclosure within which such IO endpoint is disposed.

25. The apparatus of claim 24, wherein the configuration data associated with a first IO enclosure among the plurality of IO enclosures is stored in non-volatile memory resident in the first IO enclosure.

26. The apparatus of claim 22, wherein the program code is configured to non-uniformly allocate memory address ranges to the plurality of IO slots by allocating a remaining memory address range to a last IO slot among the plurality of IO slots, wherein the remaining memory address range comprises that portion of the memory address range allocated to the PCI-compatible host that was not allocated to each other IO slot among the plurality of IO slots.

27. The apparatus of claim 22, wherein a PCI-compatible bus among the plurality of PCI-compatible buses includes a PCI-compatible host bridge, wherein the program code is further configured to allocate a memory address range to the PCI-compatible host bridge, and wherein the program code is configured to non-uniformly allocate memory address ranges to the plurality of IO endpoints by allocating memory address ranges to a plurality of IO slots coupled to the PCI-compatible host bridge from the memory address range allocated to the PCI-compatible host bridge.

28. A program product, comprising:
program code configured to allocate a memory address space to a plurality of input/output (IO) resources coupled to a plurality of IO endpoints in a memory mapped IO fabric by determining a location in the memory mapped IO fabric for each IO endpoint among the plurality of endpoints, and non-uniformly allocating memory address ranges to the plurality of IO endpoints based upon the determined locations of the IO endpoints in the memory mapped IO fabric, wherein the program code is configured to allocate memory address ranges to the plurality of IO endpoints by allocating differently sized memory address ranges to first and second IO endpoints having the same connector type; and
a tangible computer readable medium bearing the program code.

29. The program product of claim 28, wherein the computer readable medium includes a recordable medium.

30. A method of allocating memory addresses to a plurality of input/output (IO) resources coupled to a plurality of IO endpoints in a memory mapped IO fabric, the method comprising:
determining a location in the memory mapped IO fabric for each IO endpoint among the plurality of endpoints; and
non-uniformly allocating memory address ranges to the plurality of IO endpoints based upon the determined locations of the IO endpoints in the memory mapped IO fabric;
wherein determining the location and non-uniformly allocating memory address ranges are performed during initialization of the memory mapped IO fabric, wherein determining the location and non-uniformly allocating memory address ranges are performed during initialization of a computer to which the memory mapped IO fabric is coupled, wherein the computer comprises a logically-partitioned computer, and wherein determining the location and non-uniformly allocating memory address ranges are performed by a partition manager in the logically-partitioned computer.

31. A method of allocating memory addresses to a plurality of input/output (IO) resources coupled to a plurality of IO endpoints in a memory mapped IO fabric, the method comprising:
determining a location in the memory mapped IO fabric for each IO endpoint among the plurality of endpoints; and
non-uniformly allocating memory address ranges to the plurality of IO endpoints based upon the determined locations of the IO endpoints in the memory mapped IO fabric;
wherein the memory mapped IO fabric comprises a PCI-compatible fabric, wherein the memory mapped IO fabric comprises a plurality of PCI-compatible buses, wherein at least a subset of IO endpoints are IO slots coupled to the plurality of PCI-compatible buses, wherein the location of each IO slot is defined by a bus identifier for the PCI-compatible bus to which such IO slot is coupled, and a slot identifier for such IO slot on the PCI-compatible bus to which such IO slot is coupled, wherein a PCI-compatible bus among the plurality of PCI-compatible buses includes a PCI-compatible host bridge, the method further comprising allocating a memory address range to the PCI-compatible host bridge, wherein non-uniformly allocating memory address ranges to the plurality of IO endpoints includes allocating memory address ranges to a plurality of IO slots coupled to the PCI-compatible host bridge from the memory address range allocated to the PCI-compatible host bridge.

32. An apparatus, comprising:
at least one processor;
program code configured to be executed by the at least one processor to allocate memory address space to a plurality of input/output (IO) resources coupled to a plurality of IO endpoints in a memory mapped IO fabric by determining a location in the memory mapped IO fabric for each IO endpoint among the plurality of endpoints, and non-uniformly allocating memory address ranges to the plurality of IO endpoints based upon the determined locations of the IO endpoints in the memory mapped IO fabric, wherein the program code is configured to determine the location and non-uniformly allocate memory address ranges during initialization of the memory mapped IO fabric, wherein the program code is configured to determine the location and non-uniformly allocate memory address ranges during initialization of the apparatus, wherein the apparatus comprises a logically-partitioned computer, and wherein the program code is resident in a partition manager in the logically-partitioned computer.

33. An apparatus, comprising:
at least one processor;
program code configured to be executed by the at least one processor to allocate memory address space to a plurality of input/output (IO) resources coupled to a plurality of IO endpoints in a memory mapped IO fabric by determining a location in the memory mapped IO fabric for each IO endpoint among the plurality of endpoints, and non-uniformly allocating memory address ranges to the plurality of IO endpoints based upon the determined locations of the IO endpoints in the memory mapped IO fabric, wherein the memory mapped IO fabric comprises a PCI-compatible fabric, wherein the memory mapped IO fabric comprises a plurality of PCI-compatible buses, wherein at least a subset of IO endpoints are IO slots coupled to the plurality of PCI-compatible buses, wherein the location of each IO slot is defined by a bus identifier for the PCI-compatible bus to which such IO slot is coupled, and a slot identifier for such IO slot on the PCI-compatible bus to which such IO slot is coupled, wherein a PCI-compatible bus among the plurality of PCI-compatible buses includes a PCI-compatible host bridge, wherein the program code is further configured to allocate a memory address range to the PCI-compatible host bridge, and wherein the program code is configured to non-uniformly allocate memory address ranges to the plurality of IO endpoints by allocating memory address ranges to a plurality of IO slots coupled to the PCI-compatible host bridge from the memory address range allocated to the PCI-compatible host bridge.

* * * * *